(12) United States Patent
Lohmann

(10) Patent No.: US 6,382,359 B1
(45) Date of Patent: May 7, 2002

(54) HAND/CO-TRAVELLER LIFT TRUCK WITH A HOLDING BAR

(75) Inventor: Helmut Lohmann, Nartum Gyhum (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 09/430,853

(22) Filed: Oct. 29, 1999

(51) Int. Cl.⁷ .................................................. B66F 9/06
(52) U.S. Cl. ...................................... 187/231; 187/222
(58) Field of Search ................................ 187/222, 224, 187/231

(56) References Cited

U.S. PATENT DOCUMENTS

| | | | | |
|---|---|---|---|---|
| 1,865,784 A | * | 7/1932 | Parker | 187/222 |
| 2,885,016 A | * | 5/1959 | Ayers | 187/224 |
| 3,235,035 A | * | 2/1966 | Weaver | 187/224 |
| 3,542,161 A | * | 11/1970 | Ulinski | 187/222 |
| 4,216,847 A | * | 8/1980 | Jalbert et al. | 187/224 |
| 4,287,966 A | * | 9/1981 | Frees | |
| 5,275,255 A | * | 1/1994 | Huntley et al. | |
| 5,740,887 A | * | 4/1998 | Unger et al. | 187/231 |
| 5,805,256 A | * | 9/1998 | Miller | 348/734 |
| 5,839,542 A | * | 11/1998 | Seng et al. | 187/222 |
| 5,890,562 A | * | 4/1999 | Bartels et al. | 187/224 |

FOREIGN PATENT DOCUMENTS

JP      4-89797      * 3/1992

* cited by examiner

Primary Examiner—Robert P. Olszewski
Assistant Examiner—Steven B. McAllister
(74) Attorney, Agent, or Firm—Vidas, Arrett & Steinkraus, P.A.

(57) ABSTRACT

A hand/co-traveller lift truck with a steering column, with a standing platform as a standing space for a co-travelling person and with a holding bar which extends essentially transversely to the longitudinal direction of the lift truck and which is arranged between the steering column and load region, said holding bar being for the co-travelling person, in particular for firmly holding onto during the driving operation, and on which there is provided a switch means for controlling the truck functions, wherein the switch means comprises at least one switch box which is arranged outside the middle longitudinal axis of the lift truck on the holding bar, in particular for operation by the co-travelling person.

4 Claims, 3 Drawing Sheets

PRIOR ART

HAND/CO-TRAVELLER LIFT TRUCK WITH A HOLDING BAR

BACKGROUND OF THE INVENTION

The invention relates to a hand/co-traveller lift truck with a steering column, with a standing platform as a standing space for a co-travelling person and with a holding bar which extends essentially transversely to the longitudinal direction of the lift truck and which is arranged between the steering column and load region, said holding bar being for the co-travelling person, in particular for firmly holding onto during the driving operation, and on which there is provided a switch means for controlling the truck functions.

Such hand/co-traveller lift trucks are in particular steering-column-guided pallet trucks (riders) which are used for transporting and transferring as well as also for commissioning loads. In the state of the art it is known centrally on the holding bar to provide a switch means for controlling truck functions. The disadvantage with this arrangement of the switch means is that this is not easily accessible for the operating person of the hand/co-traveller truck. In particular during the driving operation it has been ascertained that the operating person with his whole body is directed to the driving direction of the lift truck. This aligning of the operating person leads to the fact that the steering column and the holding bar with the switch means must be held in an ergonomically unfavorable position. Thus with the operating person there may arise tensions which in situations of danger may inhibit possibly even the correct gripping security or actuation of the switch means.

BRIEF SUMMARY OF THE INVENTION

It is the object of the invention to make available a holding bar with a switch means with which with a simple construction permits a secure gripping and simultaneously a simple and quick operation of the switch means.

According to the invention this object is achieved with a hand/co-traveller lift truck in which the switch means comprises at least one switch box which is arranged outside the middle longitudinal axis on the holding bar, in particular for operation by the co-travelling person. With this arrangement of the switch box it is possible for a person standing on the standing platform to operate the steering column as well as also the switch box and with this to be able to stand facing forwards in the direction of travel. The operating person during the co-travelling operation stands frontally looking in the direction of travel, on the standing surface of the lift truck.

With this it is such that the person driving the lift truck looking frontally in the drive direction holds the steering column provided on its free end with a column head centrally in front of his body. The person driving the lift truck may guide the steering column with one hand and with the other hand grip the holding bar with the switch means provided for controlling the truck functions. Apart from the aspect that the lateral arrangement of the switch means permits an ergonomic gripping, it is also the case that a view onto the switch means which is inhibited by the steering column or the column head is prevented. The arrangement according to the invention of a switch box may also additionally be effected at a switch box which is already present.

In a further formation of the invention which is useful for the practical application the switch means consists of two switch boxes which are arranged on both sides of the middle longitudinal axis distanced from this, on the holding bar. Such an arrangement on both sides is advantageous since by way of them the operating person is not restricted as to which hand must grip the holding bar or actuate the switch box. Also outside the drive operation the arrangement of switch boxes on both sides has shown to be favourable since these are also accessible on both sides of the lift truck on standstill. Thus the operation of the truck may also be simplified when the person is not located on the standing platform but stands laterally next to the lift truck.

Usefully the two switch boxes are arranged symmetrically to the middle longitudinal axis. With the symmetrical arrangement for the driving operation as well as also for the standstill operation a normal operating position may be found. Preferably both switch boxes have identical control functions.

In a particularly advantageous further formation of the invention the switch box comprises two keyboards with operating elements wherein the keyboards in each case face in opposite directions to the middle longitudinal axis. With this arrangement of the keyboards one keyboard of the switch box faces the operating person thus on the column side whilst the other keyboard faces away from the operating person, thus on the load side in the direction of the middle longitudinal axis. Such an arrangement of the keyboards is in particular useful for a simple operation of the keyboards. The operating person after he has released the grip from the holding bar may particularly simply actuate the keyboards. For example the keyboard facing the operating person may be actuated with the thumb, whilst the keyboard facing away from the operating person may for example be actuated by way of the index or middle finger.

In an arrangement of the keyboards which can be easily operated these are located below the holding bar in the direction of the standing platform. Such an arrangement permits a simple and secure gripping around on the holding bar for operating the keyboards. In a useful embodiment on the load-side keyboard there are the keys for the lifting functions. The lifting functions such as lifting and lowering may thus be actuated with the index and/or middle finger. With this arrangement the person only slightly needs to loosen his grip so that an operation with the hand lying on the holding bar may be effected. The keyboard on the load side is during standstill of the lift truck easily accessible from the side so that in the simplest way and manner a lifting and lowering may be controlled.

It has shown to be useful for the keyboard on the column side to have a quick-travel key and a horn. The keyboard on the column side is accessible for a simple operation with the thumb. A quick-travel key permits the travel with a higher speed, in particular with a speed of greater that 5.6 km/h. Exactly when during the driving operation the quick-travel knob must be constantly held, its arrangement on the keyboard on the side of the column has been shown to be ergonomically particularly favourable and permits the person to grasp the holding bar. Also the arrangement alternatively to a horn is particularly useful since for an actuation of the horn with the thumb this releases the quick-travel key and thus the truck changes into a normal travel operation.

In a further formation of the invention which can be particularly well manufactured the switch circuits comprise a keyboard mounting with two arms being at an acute angle to one another for the respective accommodation of the keyboard and with a fastening element connecting the arms, for fastening on the holding bar. The keyboard mounting has a V-shape, wherein standing on the head it is fastened on the holding arm. The operating elements are arranged in the arms of the keyboard mounting. With such a keyboard mounting it has shown to be advantageous that above the keyboards there exists the possibility of gripping and firmly holding the keyboard mounting. With the use of such a key field mounting over the whole region of the holding bar there are available gripping zones for the persons steering the truck.

In a useful further formation the fastening element of the field key mounting on its side facing the holding grip comprises a shape corresponding to the holding grip cross section, for a clamping fastening on the holding grip. Such a clamping connection of the keyboard mounting on the holding bar permits a simple assembly and alignment of the switch box on the holding bar. Also an alignment of the keyboard mounting may be effected in a simple way and manner in particularly also dependent on the person driving the truck.

BRIEF DESCRIPTION OF THE DRAWINGS

A particularly advantageous formation of the invention is described in more detail by way of the subsequent drawing. There are shown.

DETAILED DESCRIPTION OF THE INVENTION

Figure 1:
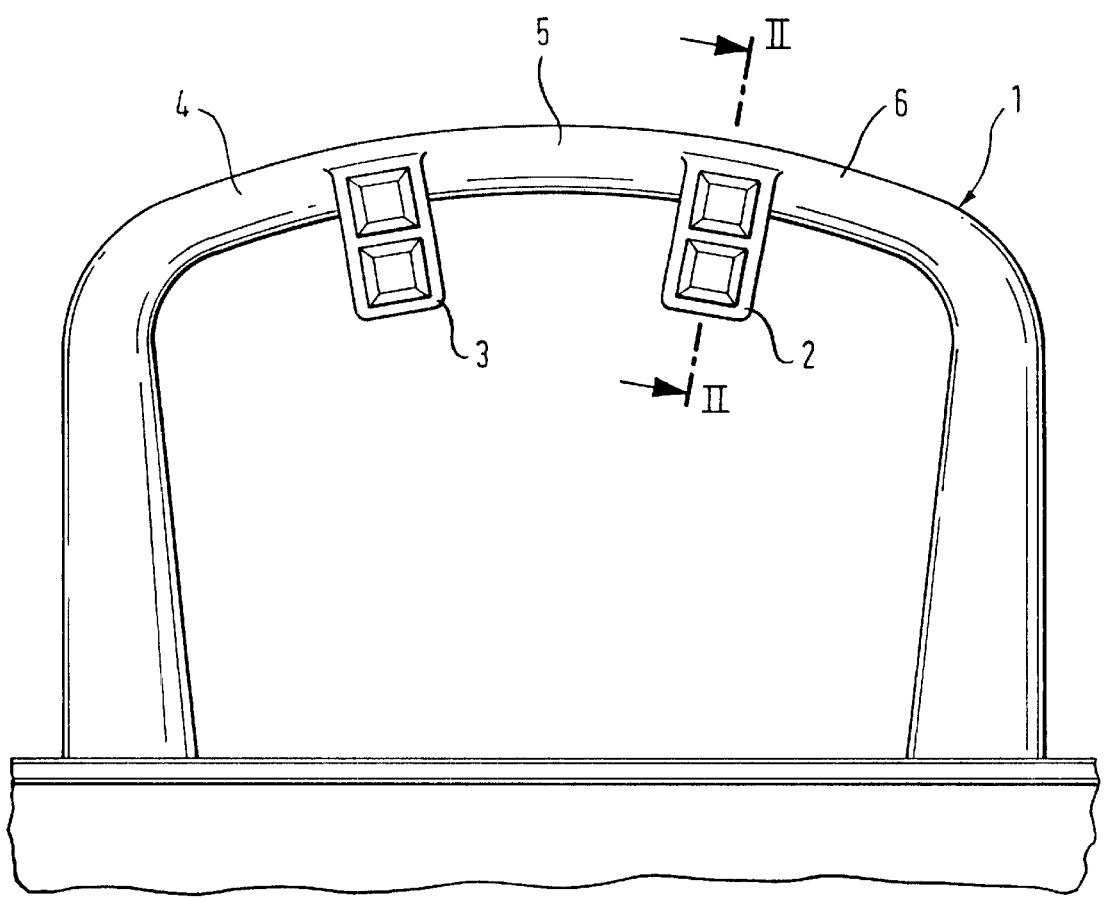
FIG. 1 a perspective view of a holding bar according to the invention with two keyboards, FIG. 2 a cross section through a keyboard along line II—II and FIG. 3 a hand/co-traveller lift truck with a holding bar according to the state of the art, in a perspective view.

FIG. 1 shows the perspective view of a holding bar 1, as is represented from the perspective of the person driving the lift truck. On the holding bar 1 there are fastened two switch boxes 2 and 3. The switch boxes 2 and 3 are arranged symmetrically to one another outside the centre. The switch boxes 2 and 3 subdivide the holding bar 1 into three differing grip regions 4, 5 and 6. In particular the outer lying grip regions 4 and 6 permit the operating person during the travel to hold firmly on the holding bar 1 with the left or the right hand. Both switch boxes have identical functions.

If the operating person grips in the grip zone 6 then he may actuate the switch key 2 with the thumb of his right hand.

Figure 2:
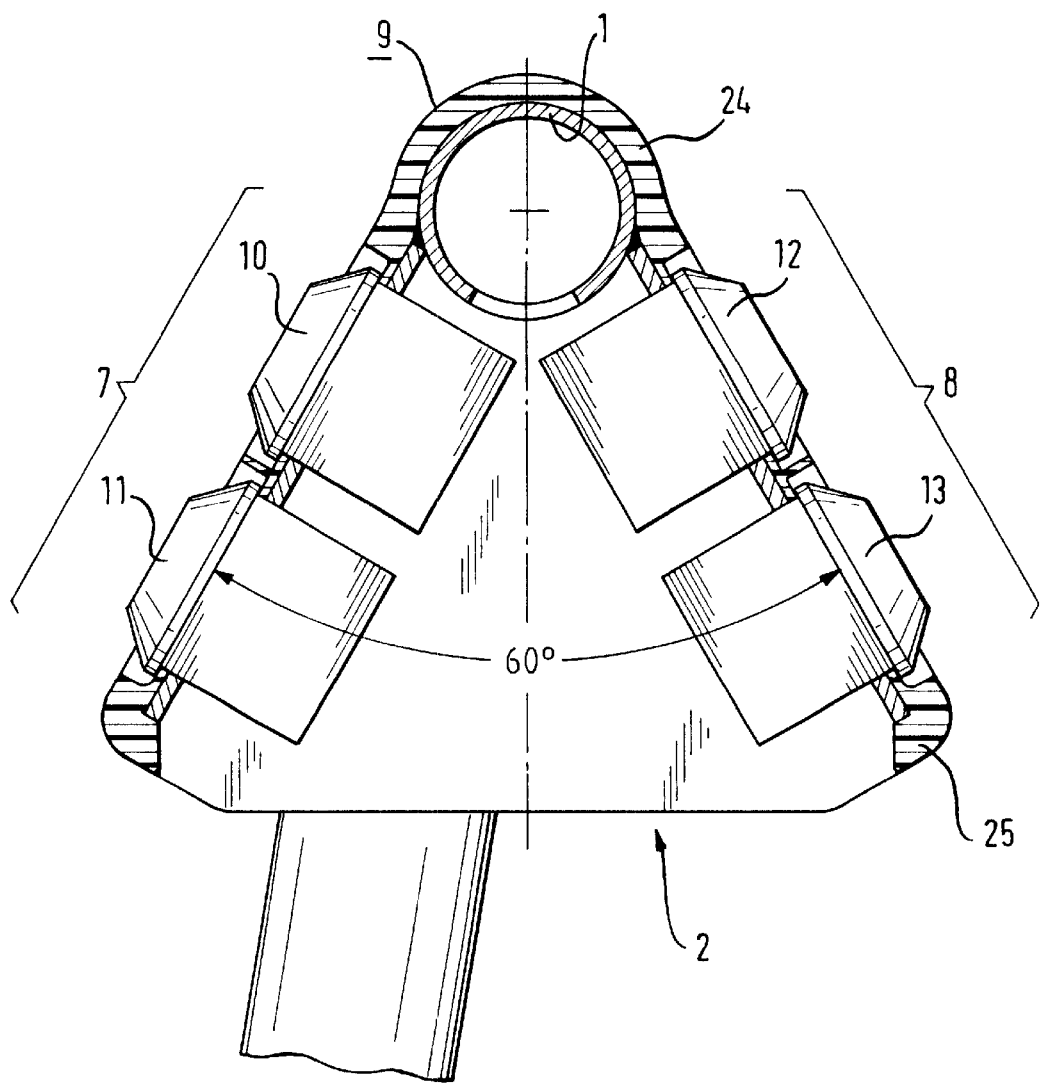

FIG. 2 shows a cross section along the line II—II from FIG. 1. In cross section it can be seen that the switch box 2 (Just as the switch box 3) comprises two keyboards 7 and 8. With the selected orientation of the section the keyboard 8 faces the steering column and the operating person of the lift truck. The keyboards 7 and 8 are arranged in a keyboard mounting 9. The keyboard mounting 9 is clamped from above onto the holding bar 1. With this the keyboard mounting makes available to the operating person in his upper region a further grip zone. In the arms 25 of the keyboard mounting 9 the keyboards with the keys are arranged for controlling truck functions. The keyboard mounting 9 is with its fastening element 24 clamped onto the holding bar 1. The keyboard mounting is formed as one piece from plastic.

In the represented embodiment example the keyboards in each case comprise two keys as operating elements. In the keyboard 7 on the load side in this embodiment example the upper key 10 actuates a lifting and the lower key 11 a lowering. The keyboard 8 on the column side in this embodiment example at the top is furnished with the function of the quick-travel key 12 and at the bottom with a horn 13. This arrangement of the keys and their function has been shown to be particularly advantageous for the practical operation. In particular the arrangement of the quick-travel key 12 in the keyboard 8 on the column side, thus facing the operating person, permits a particularly ergonomic actuation of the quick-travel key also over a longer time.

Figure 3:
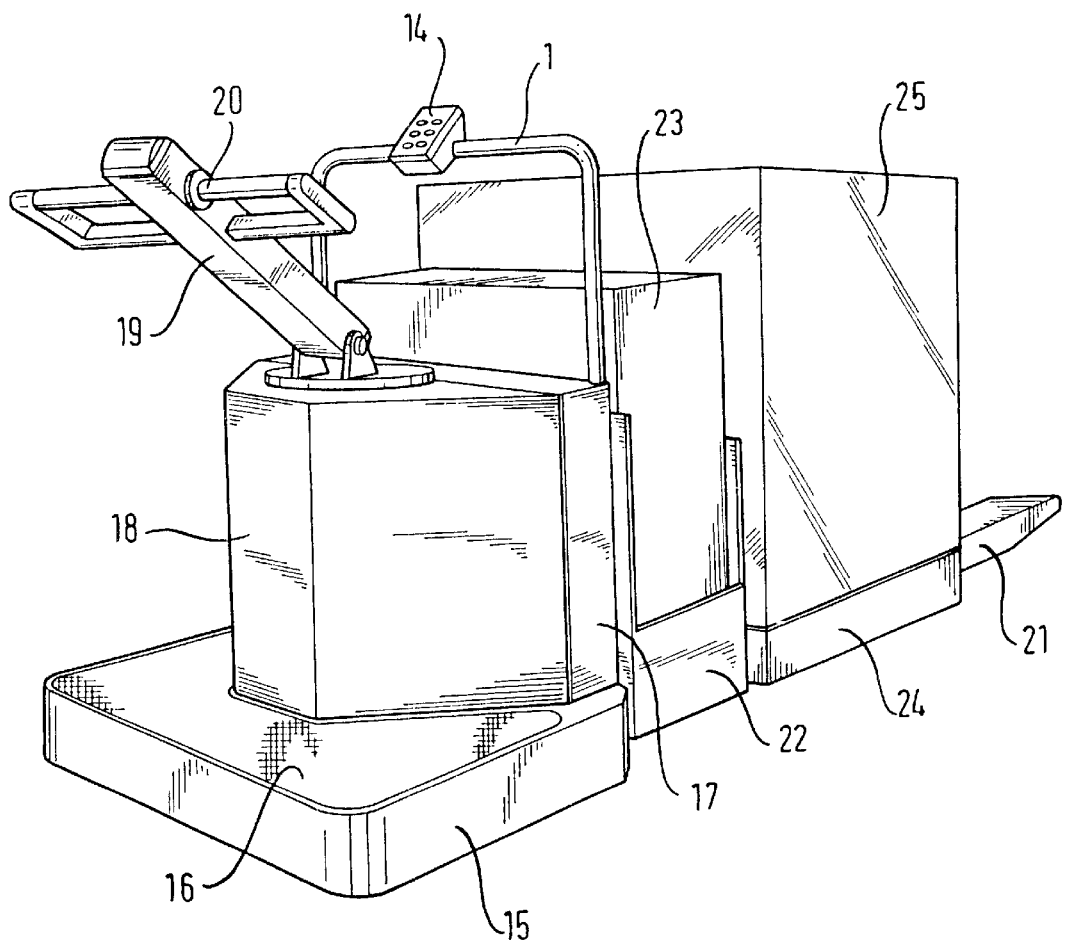

FIG. 3 shows the use of a holding bar 1 with a steering-column-guided pallet truck (rider). For the improved emphasis of the problem on which the invention is based in FIG. 3 a holding bar 1 with a switch box 14 according to the state of the art is shown. The lift truck comprises a standing platform 15 with a standing surface 16. With this the standing platform is integrated into the drive frame 17. During the operation of the lift truck a person may place himself on the standing surface 16. This is particularly effected during the driving operation of the lift truck.

As can be seen from FIG. 3 an operating person standing on the standing surface 16 is placed centrally on the standing surface 16. In this position the motor horn 18, the column tube 19 and the column head 20 are located centrally in front of the operating person. For actuating for example the quick-travel key on the switch box 14 the operating person must grip around the column head 20 and the column tube 19 when he is aligned frontally to the direction of travel of the lift truck. Such an alignment of the operating person not only results by way of the natural requirement of the person to look in the direction of travel, but is also supported additionally by the motor cover 18, in that this limits the standing surface 16.

In the represented lift truck between the column tube 19 with the column head 20 and the load fork 21 there is located the load frame 22 with a battery trough 23. For the purpose of illustration in the figure there is represented a pallet 24 with a load 25, on the load fork 21.

What is claimed is:

1. A lift truck comprising:
   a driving portion;
   a load portion;
   a steering pole at the driving portion adapted to be swivelled about a horizontal and a vertical axis;
   switch means for controlling truck functions, the switch means being actuated by operating elements;
   a holding bar on the driving portion between the pole and the load portion, the holding bar having a horizontal portion; and
   two boxes clamped to the horizontal bar portion and symmetrically arranged with respect to the longitudinal axis of the truck, the boxes having opposite sides, one side facing the driving portion and the other the load portion, each side being provided with a keyboard including the operating elements, the keyboards being arranged below the horizontal portion of the holding bar.

2. The lift truck according to claim 1, wherein the operating elements on the side facing the load portions are provided for lifting functions.

3. The lift truck according to claim 1, wherein the operating elements on the side facing the driving portion being a fast-travel key and a horn.

4. The lift truck according to claim 3, wherein the boxes comprise two arms at an acute angle to one another, each arm supporting one of the keyboards.

* * * * *